United States Patent
Kwak et al.

(10) Patent No.: US 9,903,991 B2
(45) Date of Patent: Feb. 27, 2018

(54) WIRE GRID POLARIZER AND METHOD OF FABRICATING THE SAME

(71) Applicant: Samsung Display Co., Ltd., Yongin, Gyeonggi-Do (KR)

(72) Inventors: Eun Ae Kwak, Gunpo-si (KR); Min Hyuck Kang, Seoul (KR); Moon Gyu Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 400 days.

(21) Appl. No.: 14/623,708

(22) Filed: Feb. 17, 2015

(65) Prior Publication Data

US 2016/0077263 A1 Mar. 17, 2016

(30) Foreign Application Priority Data

Sep. 12, 2014 (KR) .................. 10-2014-0121123

(51) Int. Cl.
*G02B 5/30* (2006.01)
*C09K 13/00* (2006.01)
(Continued)

(52) U.S. Cl.
CPC ............ *G02B 5/3058* (2013.01); *C09K 13/00* (2013.01); *C23F 4/00* (2013.01); *B81C 1/00388* (2013.01);
(Continued)

(58) Field of Classification Search
CPC ............ B81C 1/00388; B81C 1/00404; B81C 2201/0149; C09K 13/00; C23F 4/00;
(Continued)

(56) References Cited

U.S. PATENT DOCUMENTS 8,557,128 B2 * 10/2013 Millward ............ B81C 1/00031
216/17
9,182,673 B2 * 11/2015 Wuister ................ G03F 7/0002
(Continued)

FOREIGN PATENT DOCUMENTS

KR 1020070092368 A 9/2007
KR 1020080024316 A 3/2008
(Continued)

*Primary Examiner* — Anita K Alanko
(74) *Attorney, Agent, or Firm* — Cantor Colburn LLP (57) ABSTRACT

A method of fabricating a wire grid polarizer includes sequentially depositing a conductive wire pattern layer, and a plurality of guide patterns which forms one or more trenches therebetween on the conductive wire pattern layer, hydrophobically treating surfaces of the conductive wire pattern layer exposed in the trenches, and the guide patterns, coating the hydrophobically treated conductive wire pattern layer in the trenches with a neutral layer to partially fill the trenches, filling a remainder of the trenches with a block copolymer of two monomers with different etching rates, aligning the block copolymer filled in the trenches, selectively removing blocks of one monomer among the two monomers from the aligned block copolymer, and patterning the conductive wire pattern layer by using blocks of the other monomer among the two monomers remaining in the trenches and the guide patterns as a mask.

10 Claims, 11 Drawing Sheets (51) Int. Cl.
*C23F 4/00* (2006.01)
*H01L 21/308* (2006.01)
*G02F 1/1335* (2006.01)
*H01L 21/3065* (2006.01)
*B81C 1/00* (2006.01)
*G03F 7/004* (2006.01)
*H01L 21/306* (2006.01)

(52) U.S. Cl.
CPC .. *B81C 1/00404* (2013.01); *B81C 2201/0149* (2013.01); *G02F 2001/133548* (2013.01); *G03F 7/0041* (2013.01); *H01L 21/3065* (2013.01); *H01L 21/3081* (2013.01); *H01L 21/3083* (2013.01); *H01L 21/3086* (2013.01); *H01L 21/3088* (2013.01); *H01L 21/30604* (2013.01)

(58) Field of Classification Search
CPC ....... G02B 5/3058; G02F 2001/133548; G03F 7/0041; H01L 21/30604; H01L 21/3065; H01L 21/3081; H01L 21/3083; H01L 21/3086; H01L 21/3088
See application file for complete search history.

(56) References Cited

U.S. PATENT DOCUMENTS

| | | | |
|---|---|---|---|
| 9,354,522 B2 * | 5/2016 | Kang | G03F 7/40 |
| 9,594,200 B2 * | 3/2017 | Park | G02B 5/3058 |
| 9,612,379 B2 * | 4/2017 | Kwak | G02B 5/3058 |
| 2008/0037101 A1 * | 2/2008 | Jagannathan | G02B 5/1809 359/286 |
| 2012/0273460 A1 | 11/2012 | Kang et al. | |
| 2014/0028956 A1 * | 1/2014 | Choi | G02F 1/133528 349/96 |
| 2015/0153649 A1 * | 6/2015 | Lee | G03F 7/40 216/47 |
| 2016/0047961 A1 * | 2/2016 | Park | G02B 5/3058 359/485.05 |
| 2016/0077264 A1 * | 3/2016 | Kang | G02B 5/3058 430/321 |
| 2016/0178822 A1 * | 6/2016 | Kwak | G02B 5/3058 257/72 |

FOREIGN PATENT DOCUMENTS

| | | |
|---|---|---|
| KR | 1020120033583 A | 4/2012 |
| KR | 1020120122655 A | 11/2012 |
| KR | 1020130031401 A | 3/2013 |
| KR | 1020140030873 A | 3/2014 |
| KR | 1020140074427 A | 6/2014 |

* cited by examiner

WIRE GRID POLARIZER AND METHOD OF FABRICATING THE SAME

This application claims priority to Korean Patent Application No. 10-2014-0121123 filed on Sep. 12, 2014, and all the benefits accruing therefrom under 35 U.S.C. §119, the disclosure of which is incorporated herein by reference in its entirety.

BACKGROUND

1. Field

The invention relates to a wire grid polarizer and a method of fabricating the same.

2. Description of the Related Art

A parallel conduction wire array in which conductor wires are arranged parallel to one another to polarize certain light from electromagnetic waves is generally referred to as a wire grid polarizer.

In response to non-polarized light being incident thereto, a wire grid polarizer with a smaller period than the wavelength of the incident light reflects polarized light parallel to a direction of the wires thereof, and transmits therethrough polarized light perpendicular to the direction of the wires thereof. A wire grid polarizer is more beneficial than an absorptive polarizer in that it allows reflected polarized light to be reused.

SUMMARY

Exemplary embodiments of the invention provide a method of fabricating uniform wire grid patterns, a wire grid polarizer obtained by the method, and a display device including the wire grid polarizer.

Exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, there is provided a method of fabricating a wire grid polarizer including sequentially depositing a conductive wire pattern layer, and a plurality of guide patterns which forms one or more trenches therebetween on the conductive wire pattern layer, on a substrate, hydrophobically treating surfaces of the conductive wire pattern layer exposed in the trenches, and the guide patterns, coating the hydrophobically treated conductive wire pattern layer in the trenches with a neutral layer to partially fill the trenches, filling a remainder of the trenches with a block copolymer of two monomers with different etching rates, aligning the block copolymer filled in the trenches, selectively removing blocks of one monomer among the two monomer from the aligned block copolymer such that the other monomer among the two monomers remains in the trenches, and patterning the conductive wire pattern layer by using blocks of the remaining other monomer among the two monomers and the guide patterns as a mask.

According to an exemplary embodiment of the invention, there is provided a wire grid polarizer including a base substrate, a plurality of conductive wire patterns which protrudes from the base substrate and is arranged side-by-side with one another, and a hydrophobic layer on at least one of the conductive wire patterns.

According to an exemplary embodiment of the invention, there is provided a liquid crystal display ("LCD") device including a lower display substrate on which light is incident, an upper display substrate from which light is emitted, a liquid crystal layer between the lower display substrate and the upper display substrate, and the wire grid polarizer.

According to the exemplary embodiments, a wire grid polarizer with excellent optical properties is provided.

Other features and exemplary embodiments will be apparent from the following detailed description, the drawings, and the claims.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Advantages and features of the invention and methods of accomplishing the same may be understood more readily by reference to the following detailed description of exemplary embodiments and the accompanying drawings. The invention may, however, be embodied in many different forms and should not be construed as being limited to the exemplary embodiments set forth herein. Rather, these exemplary embodiments are provided so that this disclosure will be thorough and complete and will fully convey the invention to those skilled in the art, and the invention will be defined by the appended claims. Like reference numerals refer to like elements throughout the specification.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, embodiments of the invention will be described with reference to the accompanying drawings.

FIGS. 1 to 8 are cross-sectional views illustrating an exemplary embodiment of a method of fabricating a wire grid polarizer, according to the invention.

Figure 1:
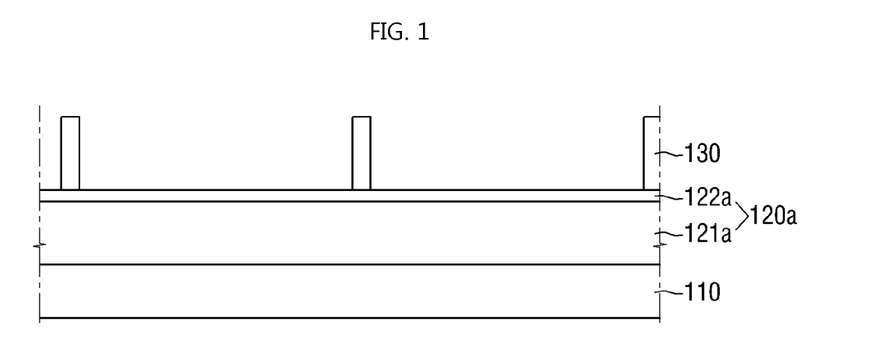
FIGS. 1 to 8 are cross-sectional views illustrating an exemplary embodiment of a method of fabricating a wire grid polarizer, according to the invention.

Referring to FIG. 1, a conductive wire pattern layer 120a and a plurality of guide patterns 130, which form one or more trenches in the conductive wire pattern layer 120a, may be sequentially deposited on a substrate 110.

The substrate 110 may transmit visible light therethrough. The material of the substrate 110 may be appropriately selected in consideration of the purpose of use of the substrate 110 and the type of processes that the substrate 110 is subjected to. In exemplary embodiments, for example, the substrate 110 may be formed of glass, quartz, acrylic, triacetylcellulose ("TAC"), cyclic olefin polymer ("COP"), cyclic olefin copolymer ("COC"), polycarbonate ("PC"), polyethylene naphthalate ("PET"), polyimide ("PI"), polyethylene naphthalate ("PEN"), polyether sulfone ("PES") or polyarylate ("PAR"), but the invention is not limited thereto. The substrate 110 may be implemented as an optical film member with flexibility.

The conductive wire pattern layer 120a may be formed of any of a number of conductive materials. In an exemplary embodiment, the conductive wire pattern layer 120a may be formed of a metallic material. More specifically, the conductive wire pattern layer 120a may be formed of one metal selected from aluminum (Al), chromium (Cr), silver (Ag), copper (Cu), nickel (Ni), titanium (Ti), cobalt (Co) and molybdenum (Mo) or an alloy thereof, but the invention is not limited thereto.

In an exemplary embodiment, the conductive wire pattern layer 120a may include two or more layers, for example, a first conductive wire pattern layer 121a and a second conductive wire pattern layer 122a.

More specifically, the first conductive wire pattern layer 121a and the second conductive wire pattern layer 122a may be formed of Al and Ti, respectively, but the invention is not limited thereto. Where the first conductive wire pattern layer 121a is formed of Al, hillocks may be generated at the top of the conductive wire pattern layer 120a depending on the temperature in a subsequent process. As a result of the hillocks generated at the top of the conductive wire pattern layer 120a, the top surface of a wire grid polarizer may become irregular, and the optical properties of the wire grid polarizer may deteriorate. To reduce or effectively prevent the hillocks generated at the top of the conductive wire pattern layer 120a, the second conductive wire pattern layer 122a may be formed on the first conductive wire pattern layer 121a by using Ti so as to prevent the generation of hillocks.

The conductive wire pattern layer 120a may be formed by sputtering, chemical vapor deposition ("CVD") or evaporation, but the invention is not limited thereto.

The guide patterns 130 may be relatively soft patterns formed of photoresist or an organic material, or relatively hard patterns formed of a metal or an inorganic material.

The guide patterns 130 may be formed by, for example, coating the substrate 110 with photoresist and subjecting the photoresist to exposure and development processes with the use of a mask. To reduce the width of the photoresist, a trimming process may be additionally performed after the development process so as to reduce the width of the guide patterns 130. Referring to FIG. 1, the width of the guide patterns 130 is defined in the horizontal direction.

The guide patterns 130 may also be formed by, for example, coating the substrate 110 with photoresist, subjecting the photoresist to exposure and development processes with the use of a mask, forming an inorganic material layer, such as a silicon oxide layer or a silicon nitride layer, on the entire surface of the substrate 110, and performing selective etching such that parts of the inorganic material layer on the sides of the photoresist may form the guide patterns 130.

Figure 2:
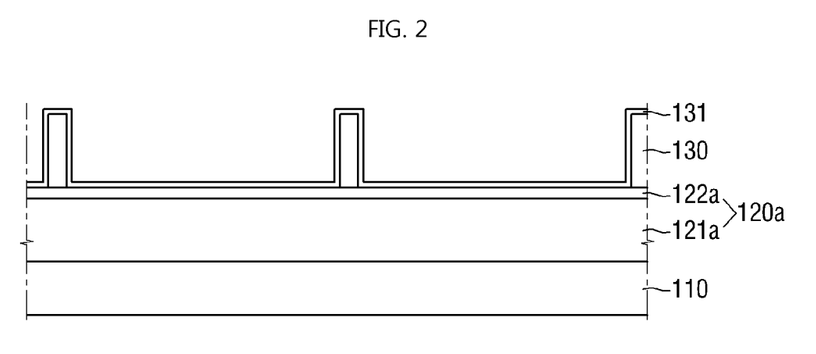

Referring to FIG. 2, exposed surfaces of the conductive wire pattern layer 120a and the guide patterns 130 may be subjected to a hydrophobic treatment process. The hydrophobic treatment process may involve forming a hydrophobic layer 131.

The hydrophobic layer 131 may be, for example, a fluorine (F)-based (e.g., fluorinated) hydrophobic layer, but the invention is not limited thereto. The hydrophobic layer 131 may be formed as a monolayer, but the invention is not limited thereto. As used herein, "fluorinated" means a compound containing at least one fluorine atom.

The hydrophobic layer 131 may be formed by atomic layer deposition ("ALD") for forming a monolayer, but the invention is not limited thereto. That is, various methods for forming a thin layer, other than ALD, may be used to form the hydrophobic layer 131.

In an exemplary embodiment, chemical ALD may be used to form the hydrophobic layer 131 on the sides of each of the guide patterns 130. Referring to FIG. 2, the hydrophobic layer 131 extends from the exposed surfaces of the conductive wire pattern layer 120a to be vertically disposed on the sides of each of the guide patterns 130. A plurality of trenches is defined by the guide patterns 130 and the conductive wire pattern layer 120a.

Figure 3:
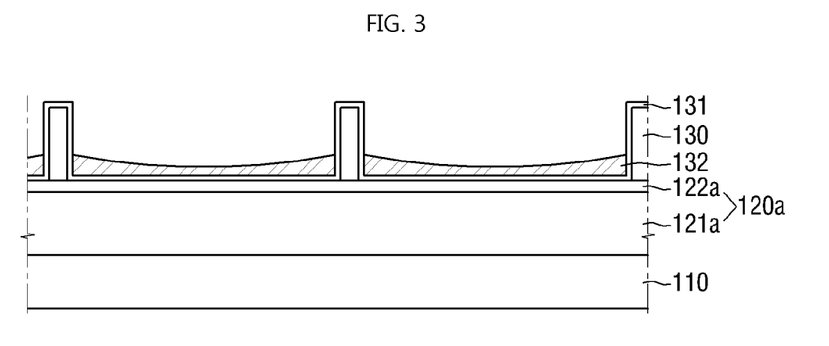

Referring to FIG. 3, a neutral layer 132 may be coated inside the trenches formed by the guide patterns 130 and the conductive wire pattern layer 120a.

The neutral layer 132 may include a random copolymer of the monomers of a block copolymer 140 (refer to FIG. 5) for a later alignment of the block copolymer 140, but the invention is not limited thereto. In an exemplary embodiment, for example, the random copolymer may be a cross-linkable random copolymer.

Due to the effect of the surface energy during coating, the neutral layer 132 may be formed in a cross-sectional shape of a half-moon to be higher on trench sides than in the middle of each of the trenches formed by the guide patterns 130 and the conductive wire pattern layer 120a.

Figure 4:
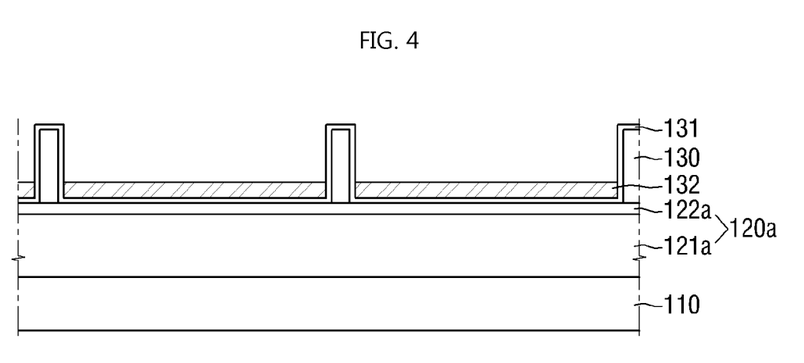

Referring to FIG. 4, the neutral layer 132 may be planarized. The trenches formed by the guide patterns 130 and the conductive wire pattern layer 120a may be partially filled with the planarized neutral layer 132.

The planarization of the neutral layer 132 may be appropriately controlled depending on a set of processing conditions such as including temperature. The neutral layer 132 may be planarized until the contact angle between the neutral layer 132 and the hydrophobic layer 131 reaches the range of about 70 degrees to about 110 degrees. When the contact angle between the neutral layer 132 and the hydrophobic layer 131 falls within the range of about 70 degrees to about 110 degrees, pattern irregularities that may be caused by the half-moon shape of the formed neutral layer 132 may be reduced or effectively prevented, and thus, a wire grid polarizer with excellent optical properties may be obtained. When the contact angle between the neutral layer 132 and the hydrophobic layer 131 falls within the range of about 70 degrees to about 110 degrees, the neutral layer 132 may be cross-linked, and as a result, a planarized neutral layer 132 may be maintained. The neutral layer 132 may be cross-linked by a thermal reaction or an optical reaction.

Figure 5:
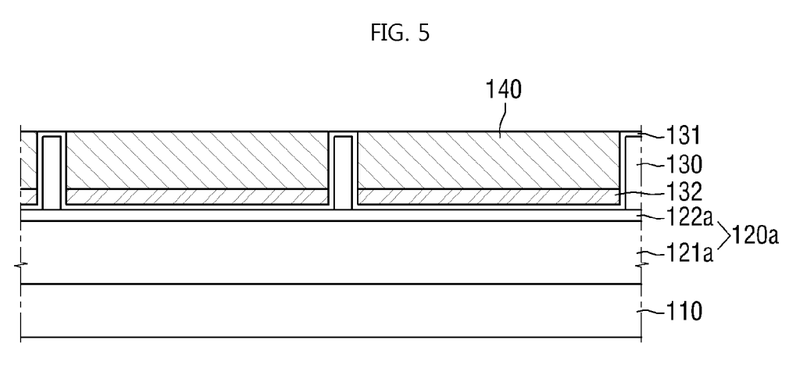

Referring to FIG. 5, the trenches formed by the guide patterns 130 and the conductive wire pattern layer 120a may be filled with a block copolymer 140 of two monomers with different etching rates. Since the neutral layer 132 has been planarized to partially fill the trenches as illustrated in FIG. 4, the block copolymer 140 may be further formed in each of the trenches formed by the guide patterns 130 and the conductive wire pattern layer 120a to a uniform cross-sectional thickness. An upper surface of the block copolymer 140 may be coplanar with an uppermost surface of the hydrophobic layer 131 on the guide patterns 130.

The block copolymer 140 may be, for example, a polystyrene ("PS")-polymethyl methacrylate ("PMMA") block copolymer, but the invention is not limited thereto.

Figure 6:
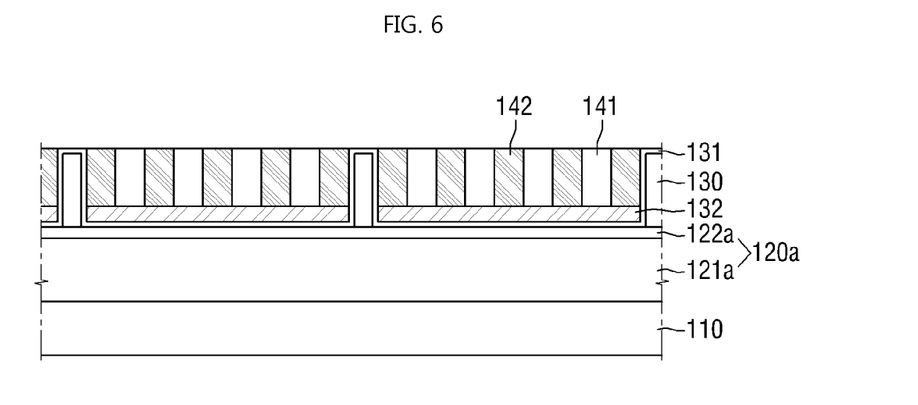

Referring to FIG. 6, the block copolymer 140 may be aligned as first monomer blocks 141 and second monomer blocks 142 through phase separation. The first monomer blocks 141 and the second monomer blocks 142 may use materials that differ from each other not only in etching rate, but also in hydrophilicity or hydrophobicity. Accordingly, the block copolymer 140 may be effectively aligned by forming the neutral layer 132 at the bottom of the block copolymer 140 and performing selective surface treatment for forming the hydrophobic layer 131 on the sides of the block copolymer 140.

The alignment of the block copolymer 140 may be performed by thermal annealing or solvent annealing, but the invention is not limited thereto. Even though solvent annealing, which involves performing annealing in a chamber containing a vaporized solvent, can reduce the amount of time to align the block copolymer 140, as compared to thermal annealing, which involves performing annealing while applying heat, one of thermal annealing and solvent annealing may be appropriately selected in consideration of the entire process layout for forming a wire grid polarizer.

Figure 7:
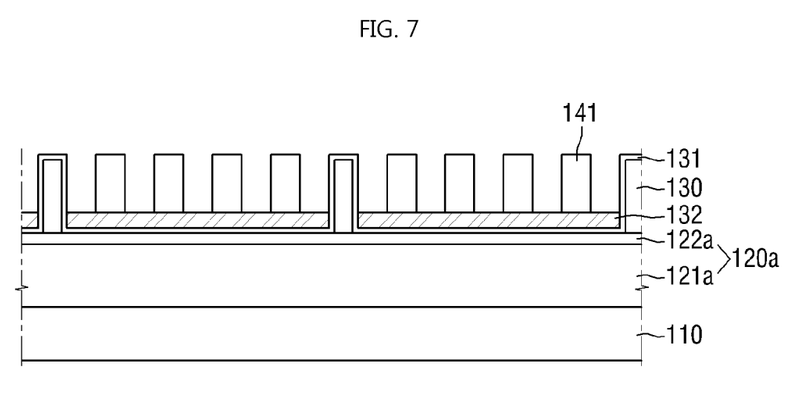

Referring to FIG. 7, the second monomer blocks 142, which have a relatively high etching rate as compared to the first monomer blocks 141, may be selectively removed. To selectively remove the second monomer blocks 142, an etching process, for example, dry etching, may be used, but the invention is not limited thereto. A gas selected from $O_2$, a fluorocarbon gas and hydrogen fluoride (HF) gas may be used in the etching process for selectively removing the second monomer blocks 142, but the invention is not limited thereto. The fluorocarbon gas may be one or more selected from $C_4F_8$, $CHF_3$, $CH_2F_2$, $CF_4$ and $C_2F_6$, but the invention is not limited thereto.

Figure 8:
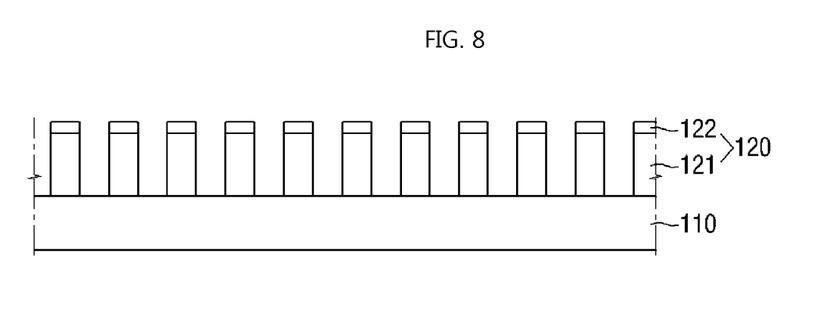

Referring to FIG. 8, the conductive wire pattern layer 120a may be etched by using the first monomer blocks 141, which have a relatively low etching rate compared to the other formed layers on the substrate 110, and the guide patterns 130 as a mask. As a result, multiple conductive wire patterns 120 may be formed to protrude from the substrate 110. Each collective conductive wire pattern 120 may include a plurality of wire pattern portions such as a first conductive wire pattern 121 and a second conductive wire pattern 122. Layers other than those in the conductive wire pattern layer 120a may be removed in the etching the first monomer blocks 141, to form the multiple conductive wire patterns 120.

Figure 9:
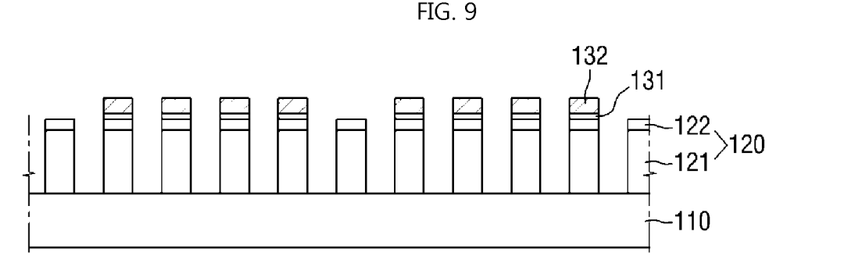
FIG. 9 is a vertical cross-sectional view of an exemplary embodiment of a wire grid polarizer according to the invention.

FIG. 9 is a vertical cross-sectional view of an exemplary embodiment of a wire grid polarizer according to the invention.

Referring to FIG. 9, a wire grid polarizer includes a substrate 110, a plurality of conductive wire patterns 120, which protrude from the substrate 110 side-by-side with one another. The conductive wire patterns 120 of a collective conductive wire pattern layer include a plurality of first conductive wire patterns 121, respectively, and a plurality of second conductive wire patterns 122, respectively. The wire grid polarizer also includes both a hydrophobic layer 131 and a neutral layer 132 among a hydrophobic layer 131 and a neutral layer 132, which are sequentially deposited on a portion of the second wire conductive wire patterns 122. That is, among the hydrophobic layer 131 and the neutral layer 132, a first portion of the second wire conductive wire patterns 122 excludes both the hydrophobic layer 131 and the neutral layer 132 while a second portion of the second wire conductive wire patterns 122 different from the first portion includes both the hydrophobic layer 131 and the neutral layer 132.

The material of the substrate 110 may be appropriately selected in consideration of the purpose of use of the substrate 110 and the type of processes that the substrate 110 is subjected to during manufacturing of the wire grid polarizer. In exemplary embodiments, for example, the substrate 110 may include glass, quartz, acrylic, TAC, COP, COC, PC, PET, PI, PEN, PES, or PAR, but the invention is not limited thereto. The substrate 110 may be implemented as an optical film member with flexibility.

The conductive wire patterns 120 may be arranged side-by-side on the substrate 110 to have a uniform period. Referring to FIG. 9, a period of the conductive wire patterns 120 may be defined as a horizontal distance between common positions of adjacent conductive wire patterns 120, but the invention is not limited thereto. The smaller the period of the conductive wire patterns 120 becomes with regard the wavelength of incident light, the higher the polarization-to-extinction ratio of the conductive wire patterns 120 becomes. However, as the period of the conductive wire patterns 120 decreases, fabrication of the conductive wire patterns 120 becomes more difficult in manufacturing the wire grid polarizer.

Visible light generally falls within the range of wavelengths of about 380 nanometers (nm) to about 780 nm. Accordingly, in order for the wire grid polarizer to have a high extinction ratio for three primary colors of light, e.g., red (R), green (G) and blue (B), the conductive wire patterns 120 may have a period of about 200 nm or less to exhibit adequate polarization performance. In order for the wire grid polarizer to provide at least equivalent polarization performance to a related-art polarizer, an exemplary embodiment of the conductive wire patterns 120 may have a period of about 120 nm or less.

The conductive wire patterns 120 may include any of a number of conductive materials. In an exemplary embodiment, the conductive wire patterns 120 may include a metallic material. More specifically, the conductive wire patterns 120 may include one metal selected from Al, Cr, Ag, Cu, Ni, Ti, Co and Mo or an alloy thereof, but the invention is not limited thereto.

More specifically, the first conductive wire patterns 121 and the second conductive wire patterns 122 may include Al and Ti, respectively, but the invention is not limited thereto. Where the first conductive wire patterns 121 include Al, hillocks may be generated at the top of the conductive wire patterns 120 depending on the temperature in a subsequent process in manufacturing the wire grid polarizer. As a result, the finally formed top surface of the wire grid polarizer may become irregular, and the optical properties of the finally formed wire grid polarizer may deteriorate. To reduce or effectively prevent the hillocks generated at the top of the conductive wire patterns 120 during manufacturing of the wire grid polarizer, the second conductive wire patterns 122 may disposed on the first conductive wire patterns 121 including Ti.

The width of the conductive wire patterns 120 may be appropriately determined as long as the conductive wire patterns 120 exhibit adequate polarization performance.

Referring again to FIG. 9, the conductive wire patterns 120 may have a width in the horizontal direction of about 10 nm to about 20 nm, but the invention is not limited thereto. The conductive wire patterns 120 may have a thickness in a vertical direction of FIG. 9 of about 10 nm to about 500 nm, but the invention is not limited thereto.

The hydrophobic layer 131 may be a F-based hydrophobic layer, but the invention is not limited thereto. The hydrophobic layer 131 may be a monolayer, but the invention is not limited thereto.

The neutral layer 132 may include a random copolymer of the monomers of a block copolymer, for example, a cross-linked random copolymer, but the invention is not limited thereto.

In an exemplary embodiment of manufacturing the wire grid polarizer, the hydrophobic layer 131 and the neutral layer 132 may be formed by using the block copolymer as a mask. In this exemplary embodiment, neither the hydrophobic layer 131 nor the neutral layer 132 is formed on (e.g., overlapping) one or more second conductive wire patterns 122 that are masked by guide patterns. Referring to FIG. 9, for example, portions of the hydrophobic layer 131 and the neutral layer 132 are disposed on some of the conductive wire patterns 120, while not being disposed on others of the conductive wire patterns 120. That is, during manufacturing of a wire grid polarizer, guide patterns masked those other conductive wire patterns 120 on which the hydrophobic layer 131 and the neutral layer 132 are not disposed.

That is, one or more conductive wire patterns 120 with the hydrophobic layer 131 and the neutral layer 132 disposed thereon may be arranged to periodically appear on the substrate 110.

Figure 10:
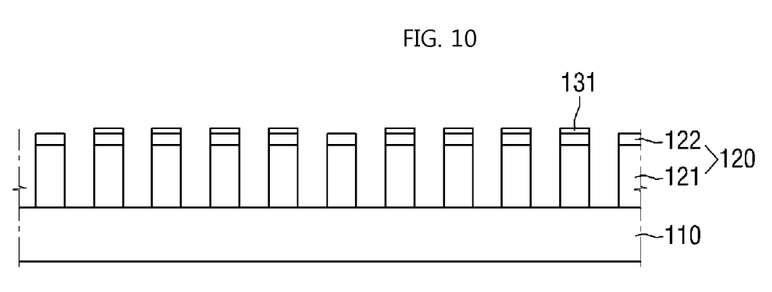
FIG. 10 is a vertical cross-sectional view of another exemplary embodiment of a wire grid polarizer according to the invention.

FIG. 10 is a vertical cross-sectional view of another exemplary embodiment of a wire grid polarizer according to the invention.

Referring to FIG. 10, a wire grid polarizer includes a substrate 110, a plurality of conductive wire patterns 120, which protrude from the substrate 110 side-by-side with one another. The conductive wire patterns 120 of a collective conductive wire pattern layer include a plurality of first conductive wire patterns 121, respectively, and a plurality of second conductive wire patterns 122, respectively, and only a hydrophobic layer 131 among a hydrophobic layer 131 and a neutral layer 132, is disposed on a portion of the second wire conductive wire patterns 122.

The wire grid polarizer of FIG. 10 is the same as the wire grid polarizer of FIG. 9 except for not including (e.g., excluding) the neutral layer 132, and thus, a detailed description thereof will be omitted.

Figure 11:
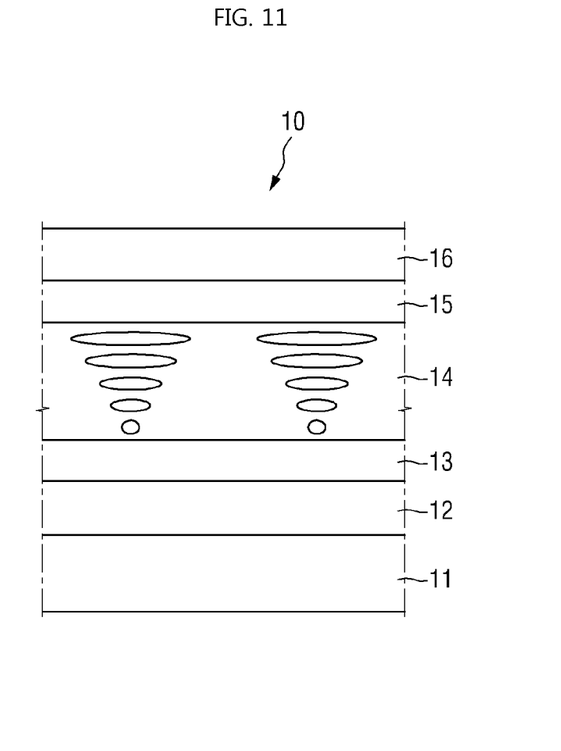
FIG. 11 is a vertical cross-sectional view of an exemplary embodiment of a display device according to the invention.

FIG. 11 is a vertical cross-sectional view of an exemplary embodiment of a display device according to the invention.

Referring to FIG. 11, a liquid crystal display ("LCD") device 10 may include a backlight unit 11, which emits light, a liquid crystal panel (12, 13, 14, 15), which is deposited on the backlight unit 11 and includes a lower display substrate 12, a lower polarizing plate 13, a liquid crystal layer 14 and an upper display substrate 15, and an upper polarizing plate 16, which is disposed on the liquid crystal panel (12, 13, 14, 15).

The transmission axes of the lower polarizing plate 13 and the upper polarizing plate 16 may be orthogonal or parallel to each other.

The LCD device 10 is illustrated in FIG. 11 as having both the upper polarizing plate 16 and the lower polarizing plate 13, but the invention is not limited thereto. That is, the upper polarizing plate 16 may be optional.

The backlight unit 11 may include a light guide plate ("LGP") (not illustrated), a light source unit (not illustrated), a reflective member (not illustrated) and one or more optical sheets (not illustrated).

The LGP, which changes the path of light emitted from the light source unit so as for the light to be transmitted toward the liquid crystal layer 14, may include a light incidence surface upon which light is incident and a light emission surface through which light is emitted toward the liquid crystal layer 14. The LGP may include a light-transmissive material with a predetermined refractive index, such as PMMA or PC, but the invention is not limited thereto.

Light incident upon one or both sides of the LGP may have a smaller incidence angle than the critical angle of the LGP, and may thus enter the LGP. On the other hand, light incident upon the top or bottom surface of the LGP may have a greater incidence angle than the critical angle of the LGP, and may thus be evenly distributed within the LGP, instead of being emitted outward from the LGP.

A plurality of diffusion patterns may be disposed on one of the top and bottom surfaces of the LGP, for example, the bottom surface of the LGP that is opposite to and faces the emission surface, so as for guided light to be emitted upwards. More specifically, in order for light transmitted inside the LGP to be emitted upwards towards the liquid crystal layer 14, the diffusion patterns may be disposed on one surface of the LGP. In a method of manufacturing the LCD device 10, the diffusion patterns may be disposed on one surface of the LGP through, for example, printing with the use of ink, but the invention is not limited thereto. That is, in a method of manufacturing the LCD device 10, fine grooves or protrusions may be formed on the LGP as the diffusion patterns, or various other modifications may be made to the diffusion patterns without departing from the scope of the invention.

A reflective member (not illustrated) may be additionally provided between the LGP and a lower accommodating member (not illustrated). The reflective member reflects light emitted from the bottom surface of the LGP, which is opposite to, and faces, the emission surface of the LGP, and thus applies the light back to the LGP. The reflective member may be a thin film, but the invention is not limited thereto.

The light source unit may be disposed to face the incidence surface of the LGP. The number of light source units provided may be appropriately adjusted. In an exemplary embodiment, for example, one light source unit may be provided on only one side of the LGP. Alternatively, three or more light source units may be provided to correspond to three or more sides, respectively, of the LGP. Still alternatively, a plurality of light source units may be provided to correspond to only one side of the LGP. The backlight unit has been described above, taking as an example a side or edge light-type backlight unit in which a light source unit is provided on the side of an LGP, but the invention is not limited thereto. That is, the invention is also applicable to a direct-type backlight unit or another light source device, such as a surface-type light source device.

The light source unit may include a white light-emitting diode ("LED"), which emits white light, or a plurality of LEDs, which emit R light, G light and B light. In response to the light source unit including a plurality of LEDs, which emit R light, G light and B light, white light may be realized by turning on all the LEDs to mix the R light, G light, and B light together.

The lower polarizing plate 13 may be disposed on the lower display substrate 12. In an exemplary embodiment, for example, the lower display substrate 12 may include a plurality of conductive wire patterns, which protrude from a base substrate including a transparent insulating material such as glass or plastics, side-by-side with one another, may be disposed, as illustrated in FIG. 8, a passivation layer may be disposed on the conductive wire patterns by using an insulating material, and one or more thin-film transistors ("TFTs") and one or more pixel electrodes may be disposed on the passivation layer. Each of the TFTs includes a gate electrode, a gate insulating layer, a semiconductor layer, a resistive contact layer and source/drain electrodes. The pixel electrodes, which are electric field-generating electrodes, include a transparent conductive oxide such as indium tin oxide ("ITO") or indium zinc oxide ("IZO").

The upper display substrate 15 may be a color filter ("CF") substrate. In an exemplary embodiment, for example, the upper display substrate 15 may include a black matrix, which is provided at, and reduces or effectively prevents light from leaking from, the bottom of a base substrate including a transparent insulating material such as glass or plastic, R, G and B CFs, and a common electrode, which is an electric field generating electrode including a transparent conductive oxide such as ITO or IZO.

Plastic substrates may be used as the base substrates of the lower display substrate 12 and the upper display substrate 15. The plastic substrates may include one of PET, PC, PI, PEN, PES, PAR and COC, but the invention is not limited thereto. The lower display substrate 12 and the upper display substrate 15 may include a flexible material.

The liquid crystal layer 14, which rotates the polarization axis of incident light, is aligned in a predetermined direction and is disposed between the upper display substrate 15 and the lower display substrate 12. The liquid crystal layer 14 may be of a twisted nematic ("TN") mode, a vertical alignment ("VA") mode, or a horizontal alignment mode (such as an in-plane switching ("IPS") mode or a fringe field switching ("FFS") mode) with positive dielectric anisotropy.

The invention has been described above, taking an LCD device as an example, but one or more exemplary embodiment of the invention is also applicable to various other display devices such as an organic light-emitting display device not requiring additional light sources or an LGP, or a plasma display device using plasma.

While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

What is claimed is:

1. A method of fabricating a wire grid polarizer, comprising:
    sequentially depositing a conductive wire pattern layer, and a plurality of guide patterns which forms one or more trenches therebetween on the conductive wire pattern layer, on a substrate;
    hydrophobically treating surfaces of the conductive wire pattern layer exposed in the trenches, and the guide patterns;
    coating the hydrophobically treated conductive wire pattern layer in the trenches with a neutral layer to partially fill the trenches;
    filling a remainder of the trenches with a block copolymer of two monomers with different etching rates;

aligning the block copolymer filled in the trenches;

selectively removing blocks of one monomer among the two monomers from the aligned block copolymer such that the other monomer among the two monomers remains in the trenches; and patterning the conductive wire pattern layer by using blocks of the remaining other monomer among the two monomers and the guide patterns as a mask.

2. The method of claim 1, further comprising, after the coating with the neutral layer:

planarizing the neutral layer.

3. The method of claim 2, wherein after the planarizing the neutral layer, a contact angle between the neutral layer and the hydrophobically-treated surfaces of the conductive wire pattern layer and the guide patterns ranges from about 70 degrees to about 110 degrees.

4. The method of claim 2, further comprising, after the planarizing the neutral layer:

cross-linking the neutral layer.

5. The method of claim 4, wherein the cross-linking the neutral layer comprises performing a thermal reaction or an optical reaction.

6. The method of claim 1, wherein the aligning the block copolymer filled in the trenches comprises performing thermal annealing or solvent annealing.

7. The method of claim 1, wherein the hydrophobically treating the conductive wire pattern layer and the guide patterns comprises forming a fluorinated hydrophobic layer.

8. The method of claim 7, wherein the forming a fluorinated hydrophobic layer comprises forming the fluorinated hydrophobic layer as a monolayer.

9. The method of claim 1, wherein the depositing the guide patterns comprises coating a photoresist on the conductive wire pattern layer, developing the photoresist on the conductive wire pattern layer to form a plurality of photoresist patterns, and trimming the developed photoresist patterns to reduce a width thereof.

10. The method of claim 1, wherein the depositing the guide patterns comprises coating a photoresist on the conductive wire pattern layer, developing the photoresist on the conductive wire pattern layer to form a plurality of photoresist patterns, forming an inorganic material on sides of each of the formed photoresist patterns, and selectively etching the photoresist patterns such that the inorganic material layer on the sides of the formed photoresist patterns form the guide patterns.

* * * * *